(12) United States Patent
Moriniere

(10) Patent No.: US 11,273,485 B2
(45) Date of Patent: Mar. 15, 2022

(54) SYSTEM AND METHOD FOR INSTALLING A BLIND FASTENER IN A FASTENING SITE

(71) Applicant: Airbus Operations SAS, Toulouse (FR)

(72) Inventor: Boris Moriniere, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 17/162,307

(22) Filed: Jan. 29, 2021

(65) Prior Publication Data
US 2021/0229162 A1 Jul. 29, 2021

(30) Foreign Application Priority Data
Jan. 29, 2020 (FR) .................................... 2000878

(51) Int. Cl.
| | | |
|---|---|---|
| *B21J 15/44* | (2006.01) | |
| *B21J 15/04* | (2006.01) | |
| *B21J 15/32* | (2006.01) | |
| *B23P 19/10* | (2006.01) | |
| *B25J 17/02* | (2006.01) | |

(52) U.S. Cl.
CPC ............ *B21J 15/44* (2013.01); *B21J 15/043* (2013.01); *B21J 15/326* (2013.01); *B23P 19/102* (2013.01); *B25J 17/0208* (2013.01)

(58) Field of Classification Search
CPC ......... B23P 19/102–105; B25J 17/0208; B25J 17/0225–0233; B21J 15/043–045; B21J 15/105; B21J 15/30; B21J 15/32; B21J 15/326; B21J 15/44
See application file for complete search history.

(56) References Cited

U.S. PATENT DOCUMENTS

| | | | | |
|---|---|---|---|---|
| 5,271,686 A | * | 12/1993 | Herring, Jr | ............... B21J 15/10 403/229 |
| 5,625,940 A | * | 5/1997 | Butt | ..................... B25J 17/0208 29/709 |
| 5,836,083 A | * | 11/1998 | Sangwan | ............... B23P 19/102 33/644 |
| 2007/0226980 A1 | * | 10/2007 | Lachowski | ............. B25B 31/00 29/225 |
| 2008/0005885 A1 | | 1/2008 | Dehlke et al. | |
| 2016/0052043 A1 | | 2/2016 | Dietz | |

FOREIGN PATENT DOCUMENTS

| | | |
|---|---|---|
| DE | 102004010036 A1 | 9/2005 |
| DE | 102013002863 A1 | 8/2014 |
| DE | 102015103277 A1 | 9/2016 |

* cited by examiner

*Primary Examiner* — Matthew P Travers
(74) *Attorney, Agent, or Firm* — Greer, Burns & Crain, Ltd.

(57) ABSTRACT

A device for inserting the blind fastener in the fastening site, a pulling and extracting device for swaging the blind fastener in the fastening site and a passive compliance device that binds the inserting device to the pulling and extracting device. The passive compliance device allows the installation of the bind fastener without sensors.

11 Claims, 9 Drawing Sheets

SYSTEM AND METHOD FOR INSTALLING A BLIND FASTENER IN A FASTENING SITE

CROSS-REFERENCES TO RELATED APPLICATIONS

This application claims the benefit of the French patent application No. 2000878 filed on Jan. 29, 2020, the entire disclosures of which are incorporated herein by way of reference.

FIELD OF THE INVENTION

The present invention concerns the field of systems for installing and fitting fastenings. In particular, it concerns a system for installing a blind fastener in a fastening site.

BACKGROUND OF THE INVENTION

Most automated riveting systems correspond to multi-function systems that bore a hole (referred to as the fastening site hereinafter in the description) intended to receive the rivet, then swage the rivet in the fastening site from the same position. These multi-function systems are heavy, cumbersome and difficult to implement and maintain. Moreover, it is sometimes necessary to dismantle the assembly after the boring operation in order to perform deburring and cleaning and to apply mastic before reassembling it and inserting the fastenings. There are, therefore, single-function automated systems that are used only for positioning the rivet in the fastening site and swaging the rivet in the previously bored fastening site. However, these single-function systems require a high level of precision in order to position the rivet opposite the fastening site. Indeed, aligning the rivet opposite the fastening site can require a level of precision to within 0.2 mm to 0.5 mm. In order to achieve such a high level of precision, rigid riveting systems and/or systems equipped with high-precision sensors are generally used, for example. However, these types of systems are costly, heavy and slow to maneuver.

SUMMARY OF THE INVENTION

The present invention aims to overcome these disadvantages by proposing a system and method for installing a blind fastener in a fastening site with a high level of precision, quickly and effectively.

To this end, the invention concerns a system for installing a blind fastener in a fastening site, the fastening site comprising a first longitudinal axis, the blind fastener comprising a fastening shank and a mandrel, the fastening shank having a head and a shaft and being intended to be swaged in the fastening site, the mandrel being intended to deform the shaft of the fastening shank in order to swage the fastening shank in the fastening site, the mandrel being configured to be detached from the fastening shank by breaking after the swaging of the fastening shank, the blind fastener comprising a second longitudinal axis, the system comprising:

an insertion device configured to insert the blind fastener into the fastening site, the insertion device comprising a jaw configured to hold the blind fastener via the mandrel;

a pulling and extracting device configured to pull the jaw of the insertion device in order to apply a pulling force to the mandrel so as to deform the shaft of the fastening shank in order to swage the fastening shank in the fastening site and extract the mandrel after the fastening shank has been swaged in the fastening site and the mandrel has broken.

According to the invention, the system further comprises a passive compliance device that binds the insertion device to the pulling and extracting device, the passive compliance device being configured to allow a passive alignment of the second longitudinal axis with the first longitudinal axis during the installation of the blind fastener in the fastening site.

Therefore, as a result of the passive compliance device, the system can install a blind fastener quickly, effectively and precisely. Indeed, no high-precision sensor is needed to install the blind fastener, making it possible to obtain a system that is economical and more lightweight than a system with sensors.

Moreover, the system comprises a movement device configured to move the insertion device and the pulling and extracting device towards the fastening site in order for the fastening shank to be installed in the fastening site before swaging and to move the insertion device and the pulling and extracting device away from the fastening site once the fastening shank has been swaged.

Furthermore, the passive compliance device corresponds to a remote center compliance device comprising a first plate fastened to the pulling and extracting device, a second plate fastened to the insertion device and compliance members between the first plate and the second plate.

Moreover, the pulling and extracting device further comprises a mandrel container configured to receive the extracted mandrel.

According to one particular feature, the pulling and extracting device comprises a first tube and a pulling member, the first tube comprising a first end and a second end, the first end of the first tube being fastened to the pulling member, the first end of the first tube emerging in the mandrel container, the second end of the first tube being fastened to the jaw of the insertion device, the pulling member being configured to apply a predetermined pulling force to the jaw, the pulling force being transmitted to the jaw via the first tube, the first tube comprising a flexible section between the first plate and the second plate of the remote center compliance device, the predetermined pulling force being suitable for pulling on the jaw in order to pull on the mandrel so as to deform the shaft of the fastening shank, which is held in the fastening site by a bearing wall of the insertion device in order to swage the fastening shank in the fastening site until the mandrel breaks after the swaging of the fastening shank, the pulling and extracting device comprising a second flexible tube, the second flexible tube at least partially surrounding the flexible section of the first tube between the first plate and the second plate, the second flexible tube comprising a first end and a second end, the first end of the second flexible tube being fastened to the first plate, the second end of the second flexible tube being fastened to the second plate, the first tube being capable of sliding freely in the second flexible tube without applying any force leading to a change in the configuration of the passive compliance device.

According to another particular feature, the predetermined pulling force is also suitable for providing the mandrel with potential energy, the potential energy provided by the pulling force being capable of being transformed into kinetic energy after the mandrel has broken, the kinetic energy being capable of dislodging the mandrel from the jaw and moving the mandrel through the first tube up to the mandrel container.

The invention also concerns a method for installing a blind fastener in a fastening site implemented by the installation system, as specified above, the installation method comprising the following steps:

a step of installing the blind fastener on an insertion device, the blind fastener being held by the jaw of the insertion device via the mandrel, a step of roughly aligning the blind fastener with the fastening site comprising roughly aligning the blind fastener with the fastening site, a step of moving the blind fastener towards the fastening site, the translation module being moved by the drive module in a longitudinal direction, comprising moving the insertion device towards the fastening site in order for the fastening shank to be installed in the fastening site prior to swaging.

According to the invention, the method further comprises an alignment step implemented by the passive compliance device that binds the insertion device to the pulling and extracting device, the passive compliance device installing the blind fastener in the fastening site such that the second longitudinal axis is aligned with the first longitudinal axis.

Furthermore, the method comprises:

a step of pulling the mandrel, implemented by the pulling and extracting device, comprising pulling on the jaw in order to pull on the mandrel so as to deform the shaft of the fastening shank to swage the fastening shank in the fastening site and a step of extracting the mandrel, implemented by the pulling and extracting device, comprising extracting the mandrel after the fastening shank has been swaged in the fastening site and the mandrel has broken, a step of receiving the extracted mandrel, in the mandrel container.

According to one particular feature, the pulling step comprises:

a sub-step of pulling, implemented by the pulling member, comprising applying a predetermined pulling force to the first tube at the first end, a sub-step of swaging the fastening shank by means of the predetermined pulling force that pulls on the mandrel in order to deform the shaft of the fastening shank held in the fastening site by the bearing wall, a sub-step of breaking the mandrel after the swaging of the fastening shank.

According to another particular feature, the extraction step comprises:

a sub-step in which the mandrel stores potential energy provided by the pulling force generated by the pulling member, a sub-step of transforming the potential energy into kinetic energy after the mandrel has broken, a sub-step of dislodging the mandrel from the jaw by means of the kinetic energy, a sub-step of moving the mandrel through the first tube up to the mandrel container by means of the kinetic energy.

Moreover, the method further comprises a distancing step that comprises moving the insertion device away from the fastening site.

BRIEF DESCRIPTION OF THE DRAWINGS

The details and advantages of the invention will become clearer on reading the description in reference to the appended drawings, in which.

DETAILED DESCRIPTION OF THE PREFERRED EMBODIMENTS

Figure 1:
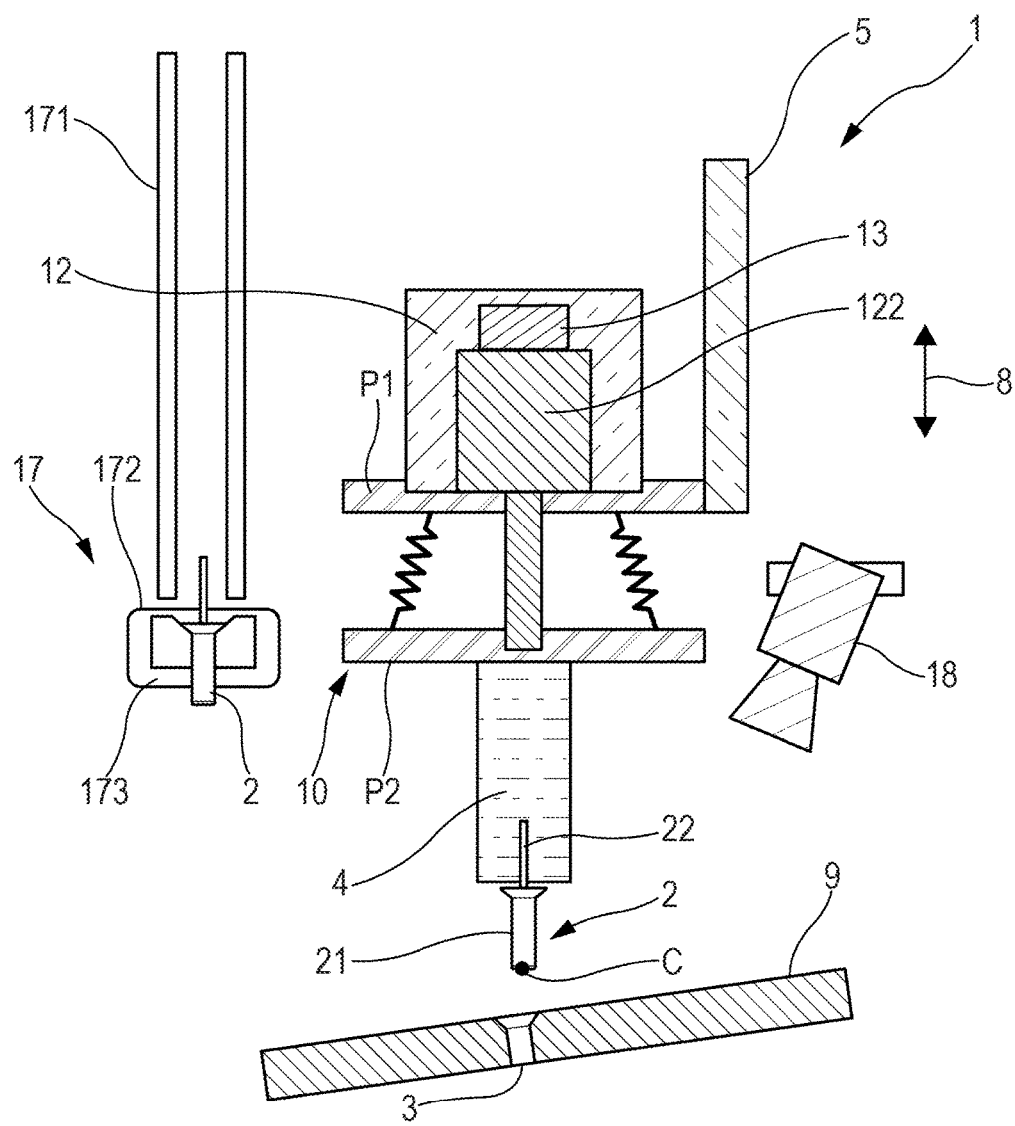
FIG. 1 shows, schematically, the installation system.
Figure 2:
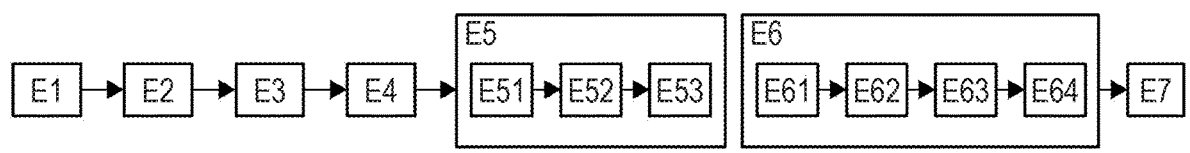
FIG. 2 shows, schematically, the installation method.

The system 1 for installing a blind fastener 2 in a fastening site 3 is shown schematically in FIG. 1. Hereinafter in the description, the system 1 for installing a blind fastener 2 in a fastening site 3 is referred to as "system 1".

The fastening site 3 can correspond to a (non-blind) hole that is bored through at least two parts, such as plates, that are to be fastened together. The fastening site 3 comprises a longitudinal axis A1.

Figure 11:
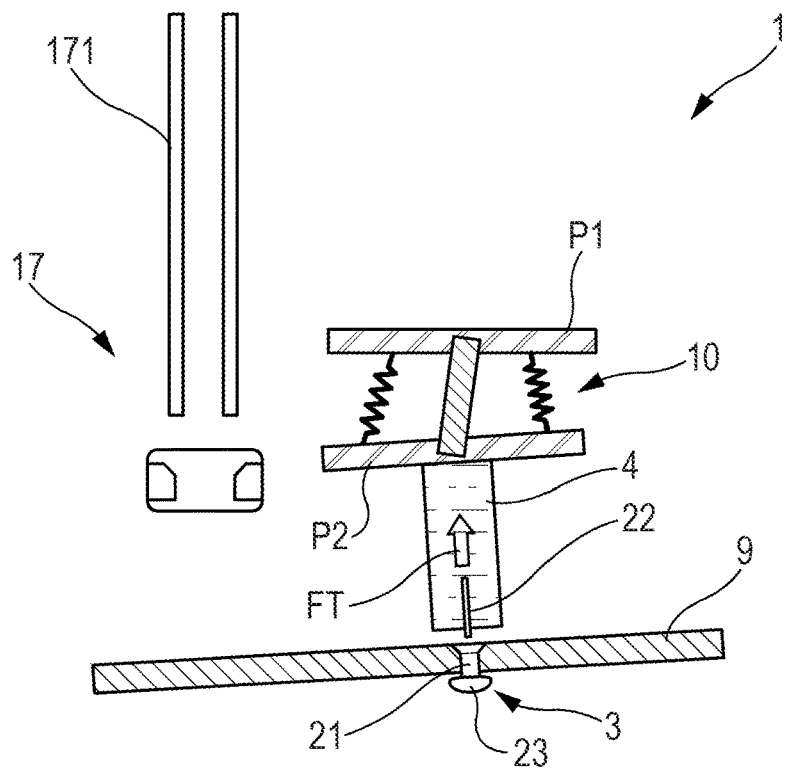
FIG. 11 shows, schematically, a step of the method.
Figure 12:
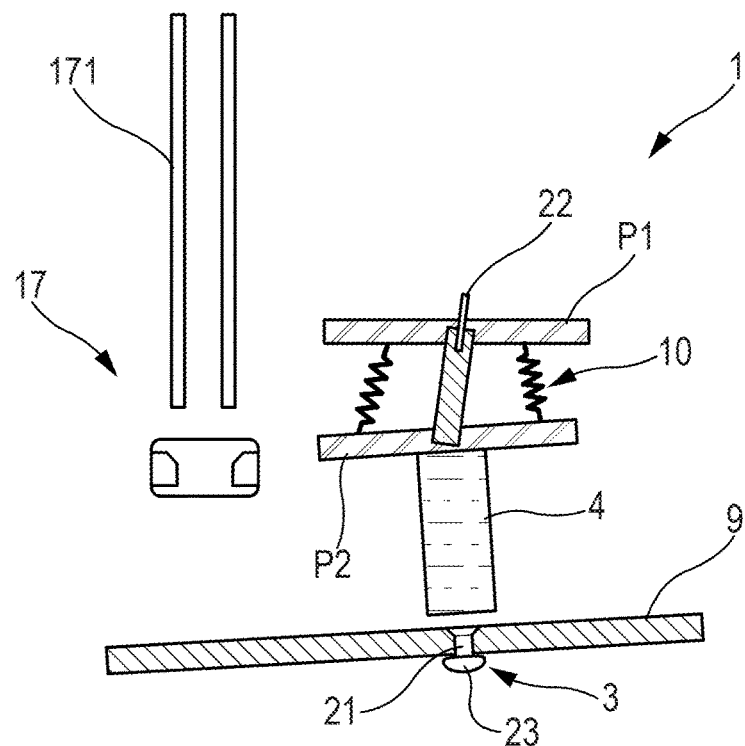
FIG. 12 shows, schematically, a step of the method.
Figure 13:
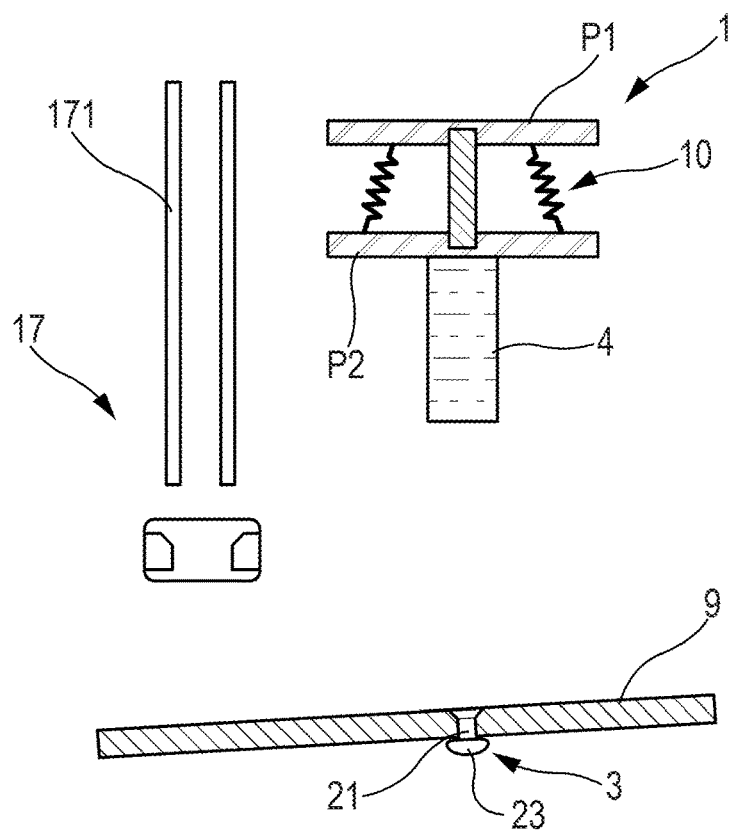
FIG. 13 shows, schematically, a step of the method.
Figure 14:
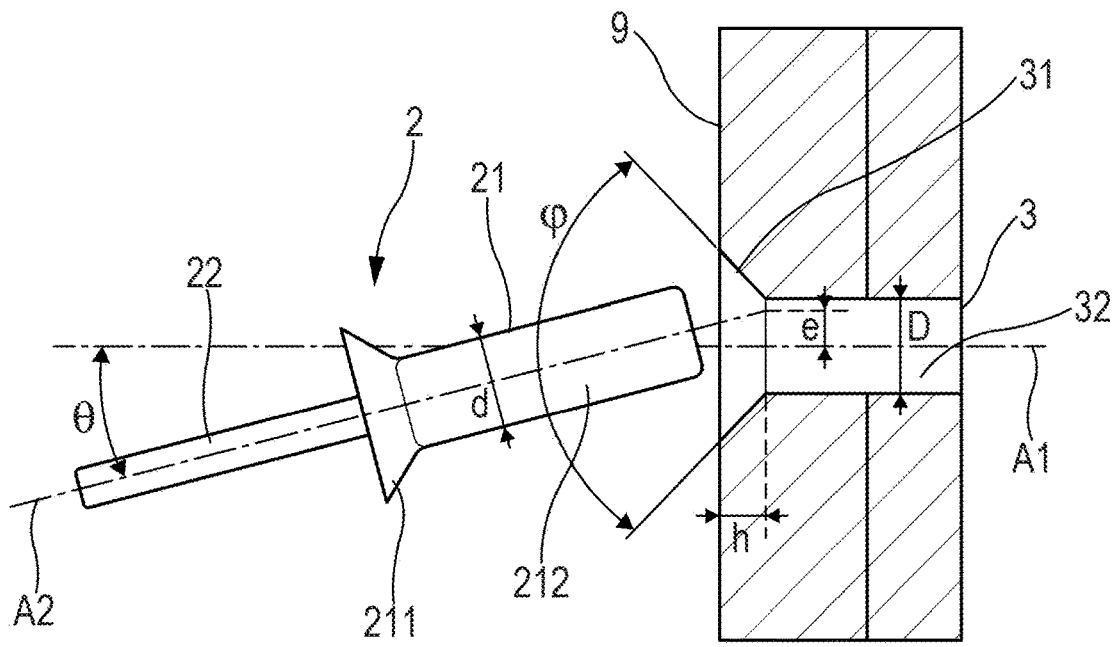
FIG. 14 shows a blind fastener and a fastening site with the parameters contributing to the installation of the blind fastener in the fastening site.

The blind fastener 2 comprises a fastening shank 21 and a mandrel 22. The fastening shank 21 can be the shank of a blind rivet. The fastening shank 21 has a head 211 and a shaft 212, as shown in FIG. 14. The fastening shank 21 is intended to be swaged in the fastening site 3. The fastening shank 21 can be swaged by deforming or flattening a free end of the shaft 212. Thus, when the fastening shank 21 is swaged, the head 211 and the deformed or flattened part 23 of the shaft 212 clamp the at least two parts between them (the head 211 and the deformed or flattened part 23 of the shaft 212) (FIGS. 11 to 13). The blind fastener 2 comprises a longitudinal axis A2.

The blind fastener 2 further comprises a mandrel 22 intended to deform the shaft 212 of the fastening shank 21 in order to swage the fastening shank 21 in the fastening site 3.

For example, the mandrel 22 is coaxial with the fastening shank 21. The mandrel 22 has a first end held at the free end of the shaft 212 and a second end exiting the fastening shank 21 via the head 211. The mandrel 22 moreover has a longitudinal axis that coincides with the longitudinal axis A2 of the fastening shank 21. Therefore, by pulling the mandrel in the longitudinal direction A2 extending from the free end of the shaft 212 towards the head 211, the first end of the mandrel 22 pulls on the free end of the shaft 212, deforming it and flattening it by moving the free end of the shaft 212 towards the head 211.

Moreover, the mandrel 22 is detached from the fastening shank 21 by breaking after the fastening shank 21 has been swaged in the fastening site 3. In order for the mandrel 22 to break, the mandrel can have a weakened zone that breaks when all the force used to deform and flatten the shaft 212 is applied to the mandrel 22. The weakened zone can correspond to a thinned portion of the mandrel 22.

The system 1 comprises an insertion device 4 configured to insert the blind fastener 2 into the fastening site 3. The insertion device 4 comprises a jaw 125 (shown in FIG. 5) configured to hold the blind fastener 2 via the mandrel 22. For example, the insertion device 4 and the jaw 125 form a nose piece.

Figure 5:
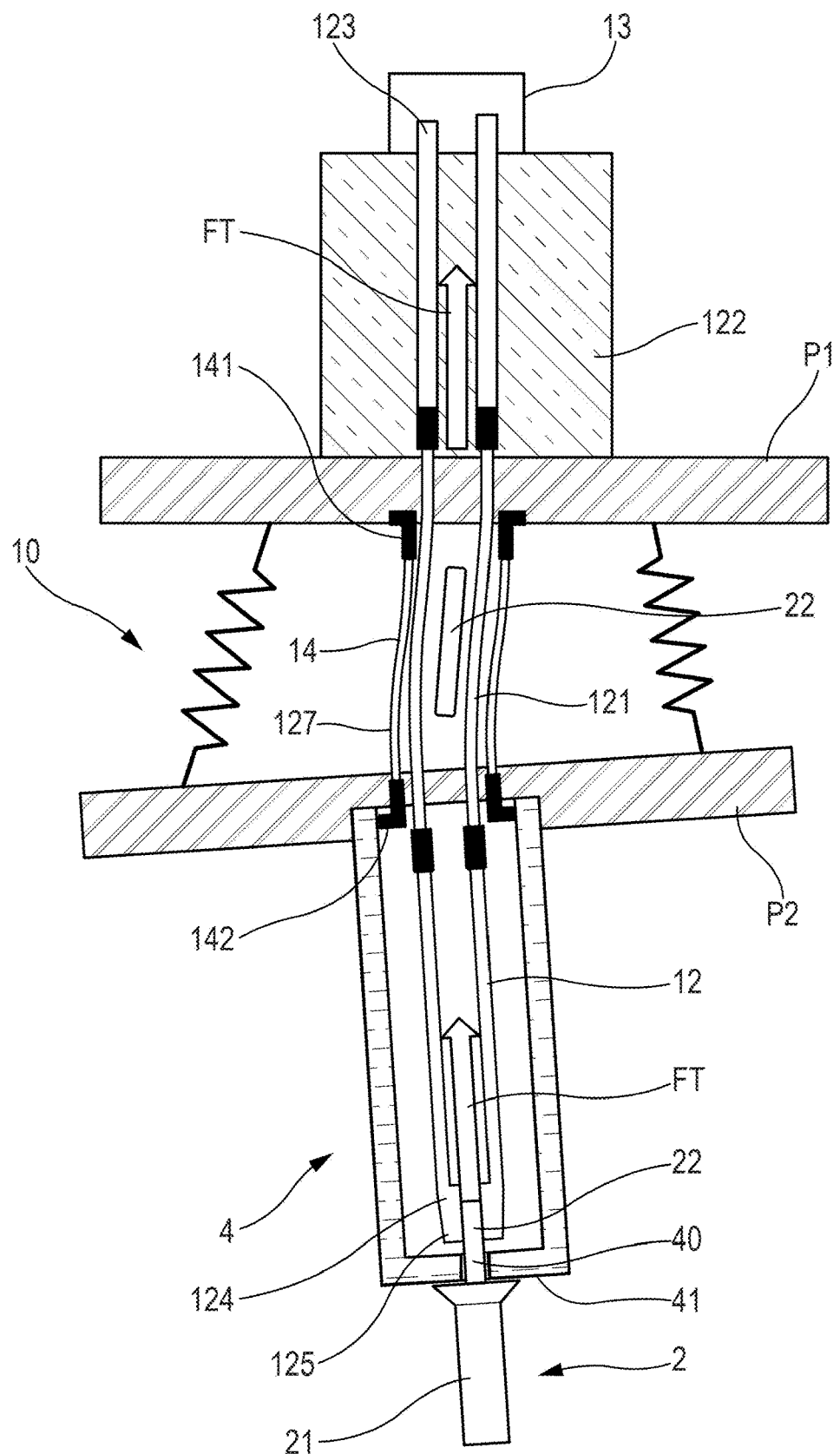
FIG. 5 shows a longitudinal cross section of the installation system showing an extracted mandrel in the first tube.

The system 1 further comprises a pulling and extracting device 12 configured to pull on the jaw 125 of the insertion device 4 in order to apply a pulling force FT to the mandrel 22 (FIG. 5). The pulling force FT on the mandrel 22 deforms the shaft 212 of the fastening shank 21 in order to swage the fastening shank 21 in the fastening site 3. The pulling and extracting device is also configured to extract the mandrel 22 after the fastening shank 21 has been swaged in the fastening site 3 and the mandrel 22 has broken.

The pulling and extracting device 12 can comprise a mandrel container 13 configured to receive the extracted mandrel 22 after it has broken. The passive compliance device 10 helps convey broken mandrels 22 from the insertion device 4 towards the pulling and extracting device 12.

The system 1 can further comprise a movement device 5. The movement device 5 is configured to move the insertion device 4 and the pulling and extracting device 12 towards the fastening site 3 in order for the fastening shank 21 to be installed in the fastening site 3 before swaging and to move the insertion device 4 and the pulling and extracting device 12 away from the fastening site 3 after swaging (once the fastening shank 21 has been swaged).

Figure 16:
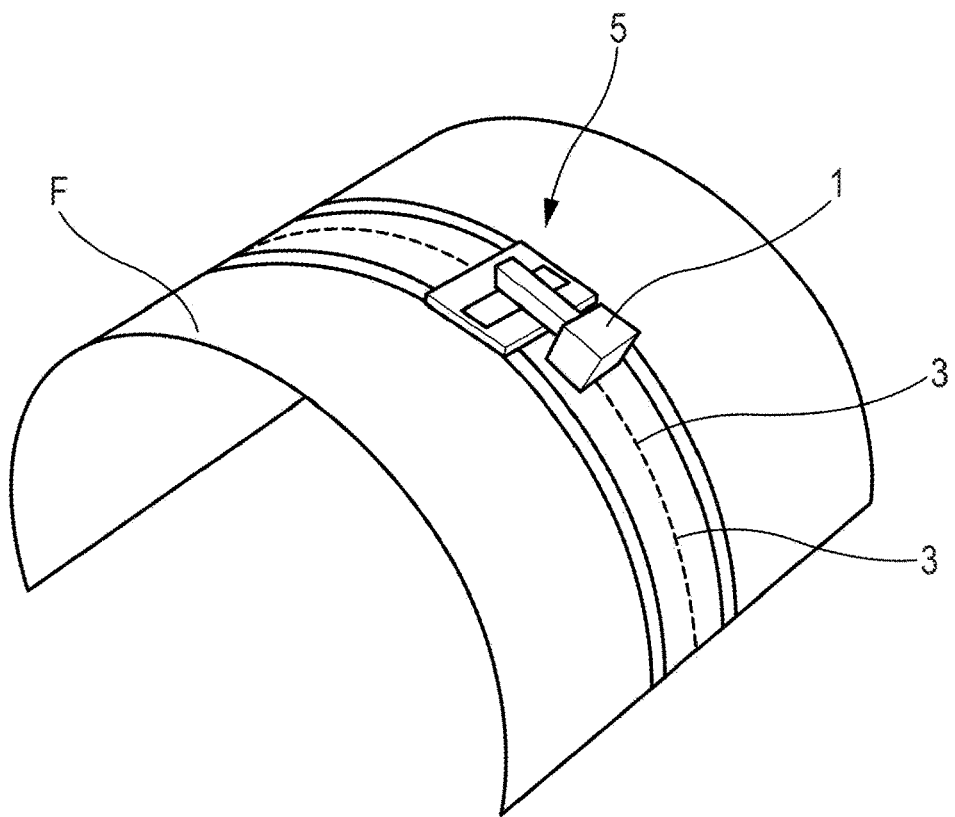
FIG. 16 shows a perspective view of an implementation example of the installation system for installing fastening shanks in order to fasten fuselage panels.

According to a first example shown in FIG. 16, the movement device 5 comprises a Cartesian manipulator. FIG. 16 shows fuselage panels F of an aircraft to be assembled using fastening shanks 21. The manipulator is guided by flexible rails arranged on the fuselage panels F along a line of fastening sites 3 in order to bring the blind fastener 2 towards each fastening site 3.

Figure 17:
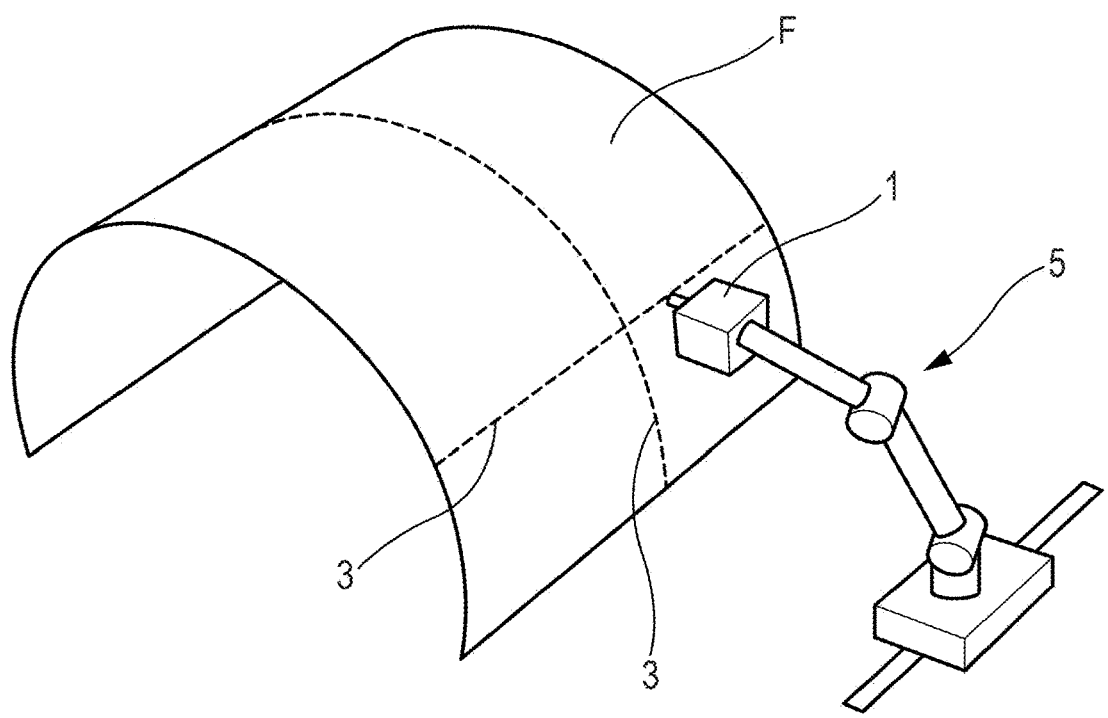
FIG. 17 shows a perspective view of another implementation example of the installation system for installing fastening shanks in order to fasten fuselage panels.

According to a second example shown in FIG. 17, the movement device 5 comprises a serial manipulator. FIG. 17 also shows fuselage panels F of an aircraft to be assembled using fastening shanks 21. The manipulator comprises an arm for bringing the blind fastener 2 towards each fastening site 3.

According to a third example not shown here, the movement device 5 comprises a motorized shaft or a set of motorized shafts for moving the insertion device 4 and the pulling and extracting device 12 towards the fastening site 3 in the direction 8 (FIG. 1).

The system 1 further comprises a passive compliance device 10 that binds the insertion device 4 to the pulling and extracting device 12. The passive compliance device 10 is configured to allow the passive alignment of the longitudinal axis A2 with the longitudinal axis A1 during the installation of the blind fastener 2 in the fastening site 3.

The movement device 5 allows the insertion device 4, the pulling and extracting device 12 and the passive compliance device 10 to be moved, together.

The fact that the passive compliance device 10 is arranged between the insertion device 4 and the pulling and extracting device 12 allows better alignment of the blind fastener 2 to be achieved in the fastening site 3. Indeed, this arrangement helps reduce the mass of the part that needs to be aligned, in order for the passive compliance device 10 to be less affected by the forces of gravity while insertion is taking place in any direction. With the present arrangement of the passive compliance device 10, the part that needs to be aligned comprises only the insertion device 4.

Compliance corresponds to the ability of a device to react and modify its configuration depending on the external forces likely to be applied to it. Passive compliance is achieved by means of mechanical elements which, under the effect of contact forces, modify their geometric configuration in such a way as to compensate for positioning errors. For example, the contact forces applied between the fastening shank 21 and the fastening site 3 make it possible to compensate the positioning of the insertion device 4 and, therefore, of the fastening shank 21, relative to the fastening site 3, by means of the passive compliance device 10.

The fastening site 3 can be in a form comprising two parts: one part 31 has a truncated cone shape and one part 32 is cylindrical. The part 31 is arranged before the part 32 in the direction of insertion of the fastening shank 21 into the fastening site 3. The truncated cone and the cylinder have coinciding longitudinal axes. The truncated cone has a large base and a small base. The small base has a diameter equal to the diameter of the cylinder. The fastening shank 21 is configured to enter the fastening site 3 through the large base of the truncated cone. When the fastening shank 21 is installed in the fastening site 3, the shaft 212 is housed in the part 32 and the head 211 is housed in the part 31. The truncated cone shape of the part 31 allow the head 211 to be embedded, for example, in order for the aircraft AC to have a good aerodynamic performance. It can also facilitate the installation of the fastening shank 21 in the fastening site 3.

FIG. 13 shows a blind fastener 2 and a fastening site 3.

A misalignment of the fastening shank 21 relative to the fastening site 3 consists of two variables: a radial misalignment e and an angular misalignment θ, as shown in FIG. 14.

Preferably, the fastening shank 21 is inserted into the fastening site 3 without blockages when the following relationships are satisfied (FIG. 14).

$$e \leq h \tan\frac{\varphi}{2} \text{ and}$$

$$\theta \leq \frac{D-d}{\mu D},$$

in which:

h corresponds to the height of the truncated cone of the part 31,

φ corresponds to the angle between the longitudinal axis A1 and the longitudinal axis A2, D corresponds to the diameter of the cylinder of the part 32, d corresponds to the diameter of the shaft 212 of the fastening shank 21, μ corresponds to the static friction coefficient.

In a non-limiting manner, the variables above can assume the following values:

d=5.03 mm,
D=5.1 mm,
h=2 mm,
μ=0.4,
φ=100°,
e≤2.38 mm,
θ≤1.4°.

In particular, the passive compliance device 10 can correspond to a remote center compliance device 100. The remote center compliance device 100 comprises a plate P1 fastened to the pulling and extracting device 12, a plate P2 fastened to the insertion device 4 and compliance members between the plate P1 and the plate P2.

The compliance members are configured to rotate 15 (FIG. 3b) the insertion device 4 about a compliance center C when the blind fastener 2 is subjected to an angular force and/or to move the insertion device 4 in translation 16 (FIGS. 3a and 3c) when the blind fastener 2 is subjected to a lateral force. The remote center compliance device 100 is configured such that the compliance center C is situated at a free end of the shaft 212 of the fastening shank 21, the free end of the shaft 212 being the first part that comes into contact with the fastening site 3.

The compliance center C corresponds to a point where the compliance matrix is diagonal. This means that a force applied at this point in a direction results in a movement in this direction. Similarly, a torque applied at this point results in simple rotation around this point in the direction of the torque.

Figure 15:
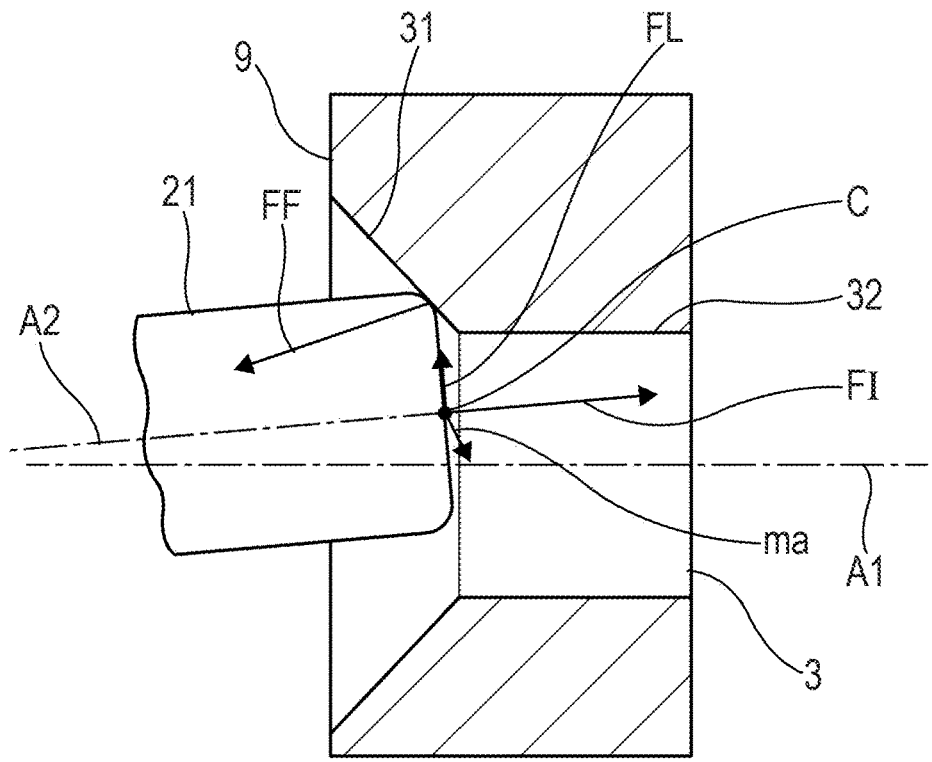
FIG. 15 shows the forces applied to the fastening shank during its installation in the fastening site.

FIG. 15 shows the forces applied to the shaft 212 of the fastening shank 21 and at the compliance center C when the fastening shank 21 touches an inner surface of the fastening site 3.

The force FI corresponds to an insertion force applied by the insertion device 4 to the fastening shank 21. The force FF corresponds to the force applied to the fastening shank 21 by the fastening site 3 at the truncated cone of the part 31. The force FL corresponds to the force applied by the passive compliance device 10 to the fastening shank 21. The force FL remains constant because the misalignment of the fastening shank 21 remains constant. The more the force FI increases, the more the force FF also increases to balance all the forces. When the force FI reaches a value higher than a value determined by the friction coefficient of the inner surface of the fastening site 3, the force FF can no longer balance the forces. Therefore, an acceleration "ma" is produced, which triggers a movement of the fastening shank 21 in order to insert the shaft 212 into the part 32 in the form of a cylinder.

Figure 4:
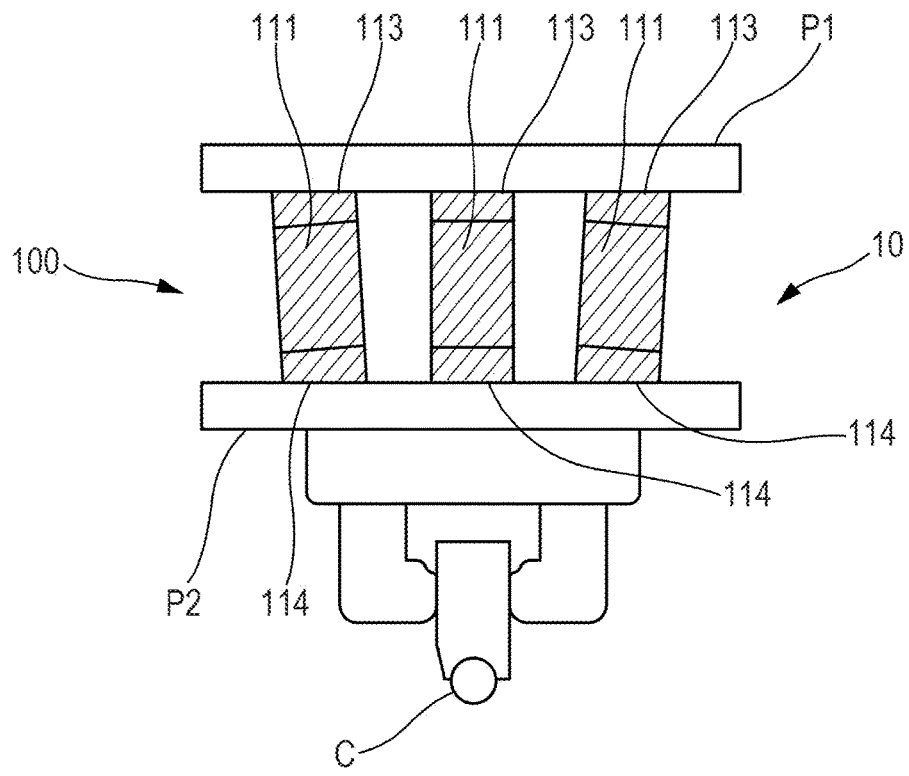
FIG. 4 shows, schematically, another embodiment of the passive compliance device.

According to a first example shown in FIG. 4, the remote center compliance device 100 comprises a first plate P1 fastened to the pulling and extracting module 12 and a second plate P2 fastened to the insertion device 4. The compliance members can correspond to elongate elements 111 made from a supple or flexible material, such as an elastomer. Each of the elongate elements 111 comprises one end 113 fastened to the plate P1 and one end 114 fastened to the plate P2.

Figures 3A, 3B, 3C:
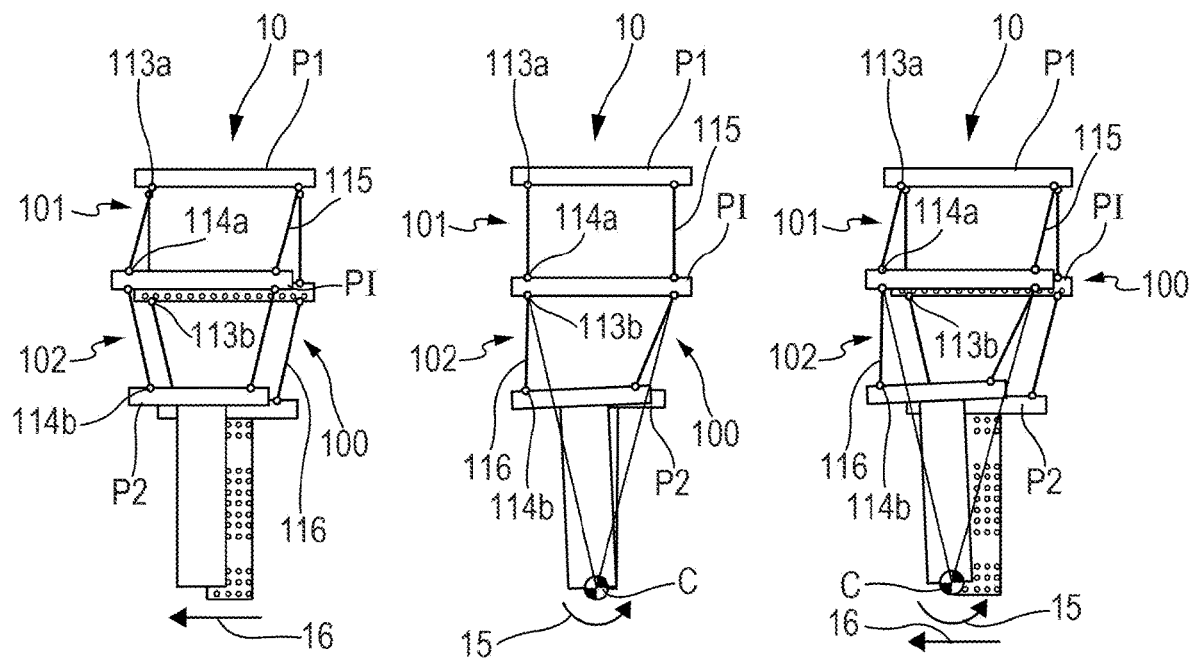
FIGS. 3a, 3b, and 3c show, schematically, an embodiment of the passive compliance device, the compliance center of which is subjected to different forces.

According to a second example shown in FIGS. 3a, 3b and 3c, the remote center compliance device 100 comprises a plate P1 fastened to the pulling and extracting module 12, a plate P2 fastened to the insertion device 4 and an intermediate plate PI situated between the plate P1 and the plate P2. Compliance members correspond to the elongate elements 115 and 116. Each of the elongate elements 115 and 116 can correspond to connecting rods. Each of the elongate elements 115 comprises one end 113a fastened and hinged to the plate P1 and one end 114a fastened and hinged to the intermediate plate PI. Each of the elongate elements 116 comprises one end 113b fastened and hinged to the intermediate plate PI and one end 114b fastened and hinged to the plate P2.

Other remote center compliance devices can be used.

The pulling and extracting device 12 can comprise a tube 121 and a pulling member 122 (FIG. 4). The tube 121 comprises an end 123 and an end 124. The end 123 of the tube 121 is fastened to the pulling member 122 which is configured to apply a predetermined pulling force FT to the tube 121 at the end 123. The pulling force FT applied to the end 123 is then transmitted to the end 124 via the tube 121. The end 123 of the tube 121 emerges in the mandrel container 13. The end 124 of the tube 121 is fastened to the jaw 125 of the insertion device 4. The pulling member 122 is configured to apply the predetermined pulling force FT to the jaw 125. The pulling force FT is transmitted to the jaw 125 via the tube 121.

The tube 121 comprises a flexible section 127 between the plate P1 and the plate P2 of the remote center compliance device 100. The flexibility of the section 127 means movements of the plate P1 relative to the plate P2 are not prevented during the insertion of the fastening shank 21.

The insertion device 4 is arranged such that the jaw 125 is accessible to the mandrel 22 via an opening 40 formed in a bearing wall 41 of the insertion device 4. The predetermined pulling force FT transmitted to the jaw 125 by the tube 121 is suitable for pulling on the mandrel 22. The shaft 212 of the fastening shank 21 held in the fastening site 3 by the bearing wall 41 is then deformed in order to swage the fastening shank 21 in the fastening site 3 until the mandrel 22 breaks after the swaging of the fastening shank 21. The bearing surface 41 corresponds to a wall of the insertion device 4. This bearing surface 41 thus acts as an anvil by holding the fastening shank 21 in the fastening site 3 while the tube 121 pulls on the mandrel 22 via the jaw 125.

In a non-limiting manner, the predetermined pulling force FT is less than or equal to 20 kN, and preferably between 7 kN and 30 kN.

The pulling member 122 can comprise a cylinder, for example an electric, pneumatic or hydraulic cylinder. The cylinder comprises a cylinder barrel and a piston. The end 123 of the tube 121 is fastened to the piston. The pulling force FT is then applied by the cylinder by means of the piston.

The pulling and extracting device 12 can further comprise a flexible tube 14 at least partially surrounding the flexible section 127 of the tube 121 between the plate P1 and the plate P2. The flexible tube 14 comprises an end 141 and an end 142. The end 141 of the flexible tube 14 is fastened to the plate P1. The end 142 of the flexible tube 14 is fastened to the plate P2. The tube 121 is capable of sliding freely in the flexible tube 14.

Therefore, the tube 121 and the flexible tube 14 together form a Bowden cable or bicycle brake cable system. A Bowden cable allows a pulling force to be transmitted via a cable surrounded by a sheath. In the Bowden cable system, the tube 121 acts as the cable fastened at one end to the pulling and extracting device 12 and at the other end to the jaw 125. The flexible tube 14 acts as the sheath attached at one end to the plate P1 and at the other end to the plate P2. This system allows the pulling force to be transmitted from the pulling member 122 to the insertion device 4 without generating disruptive forces on the passive compliance device 10, in order not to affect the accuracy of the passive alignment of the blind fastener 2 in the fastening site 3. Moreover, the fact that the tube 14 is hollow allows the removal of the mandrel 22 which travels through the tube 14 after swaging and the breaking of the mandrel 22.

The predetermined pulling force FT generated by the pulling and extracting device 12 is capable of providing potential energy to the mandrel 22. This potential energy provided by the pulling force FT is capable of being transformed into kinetic energy after the mandrel 22 has broken. The kinetic energy resulting from the transformation of the potential energy is capable of dislodging the mandrel 22 from the jaw 125 and moving the mandrel 22 through the tube 121 up to the mandrel container 13 (FIG. 4).

The system 1 can also comprise a supply device 17 configured to supply blind fastenings 2 to the insertion device 4.

Figure 6:
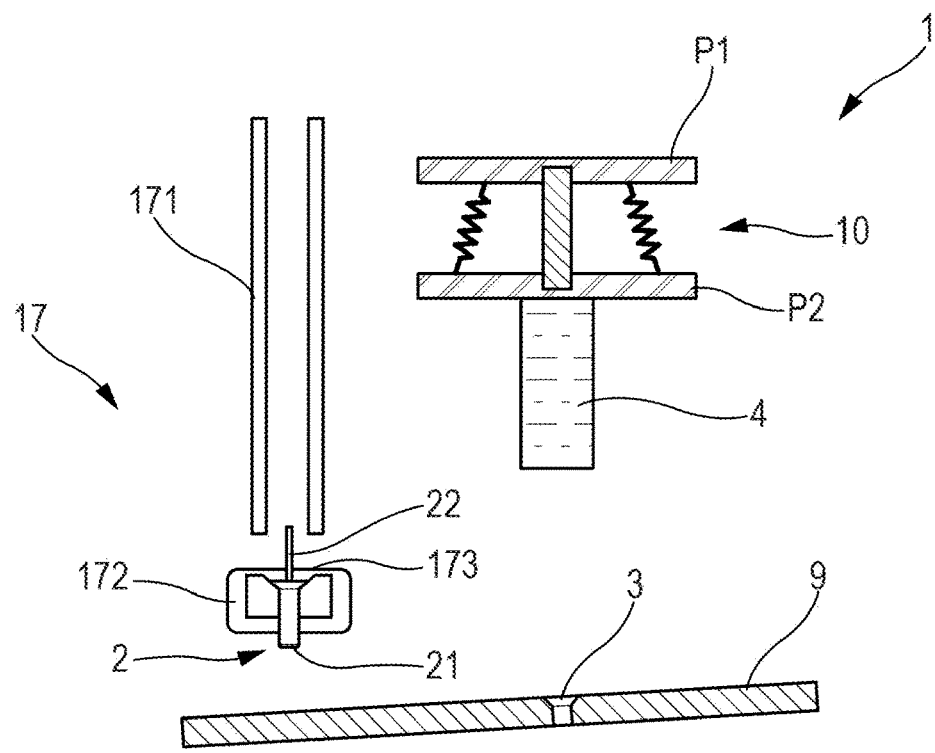
FIG. 6 shows, schematically, a step of the method implemented by the installation system.
Figure 7:
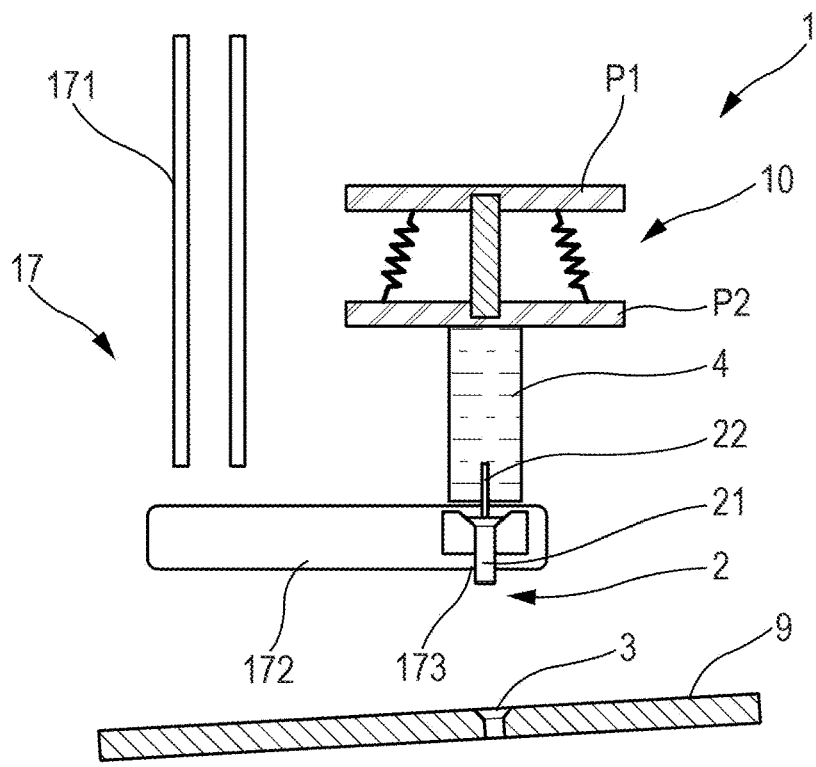
FIG. 7 shows, schematically, a step of the method.

For example, the supply device 17 comprises a supply tube 171, a rotary arm 172 and a holding system, such as a grip 173. The supply tube 171 can be used to supply blind fastenings 2 to the grip 173 situated at one end of the rotary arm 172. The blind fastener 2 is blown from a first end of the supply tube 171. The blind fastener 2 drops towards the second end of the supply tube 171 to be held by the grip 173 (FIG. 5). The rotary arm 172 then conveys the grip 173 towards the insertion device 4 such that the mandrel 22 of the blind fastener 2 can enter the opening 40 of the bearing surface 41 (FIG. 6). The jaw 125 can then take hold of the mandrel 22. After the jaw 125 has taken hold of the mandrel 22 of the blind fastener 2, the grip 173 releases the blind fastener 2. The rotary arm 172 then brings the grip 173 towards the supply tube 171 so that the grip 173 can be supplied once more with a blind fastener 2 (FIG. 7).

The system 1 can also comprise an image capture device 18, such as a camera, allowing the installation of the fastening shank 21 in the fastening site 3 to be monitored. The image capture device 18 can also be used to roughly align the system 1 relative to the fastening site 3. In a non-limiting manner, the image capture device 18 can be attached to an element secured to the plate P1 or to an element secured to the plate P2.

The invention also concerns a method for installing a blind fastener 2 in a fastening site 3 implemented by the system 1.

Figure 8:
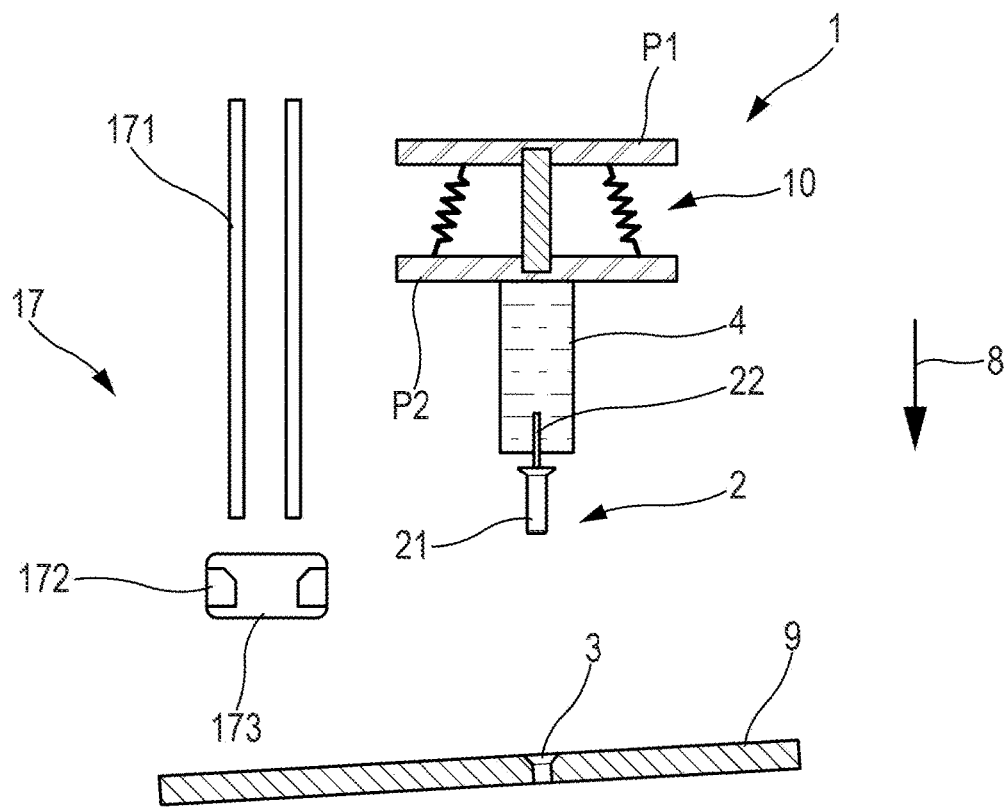
FIG. 8 shows, schematically, a step of the method.
Figure 9:
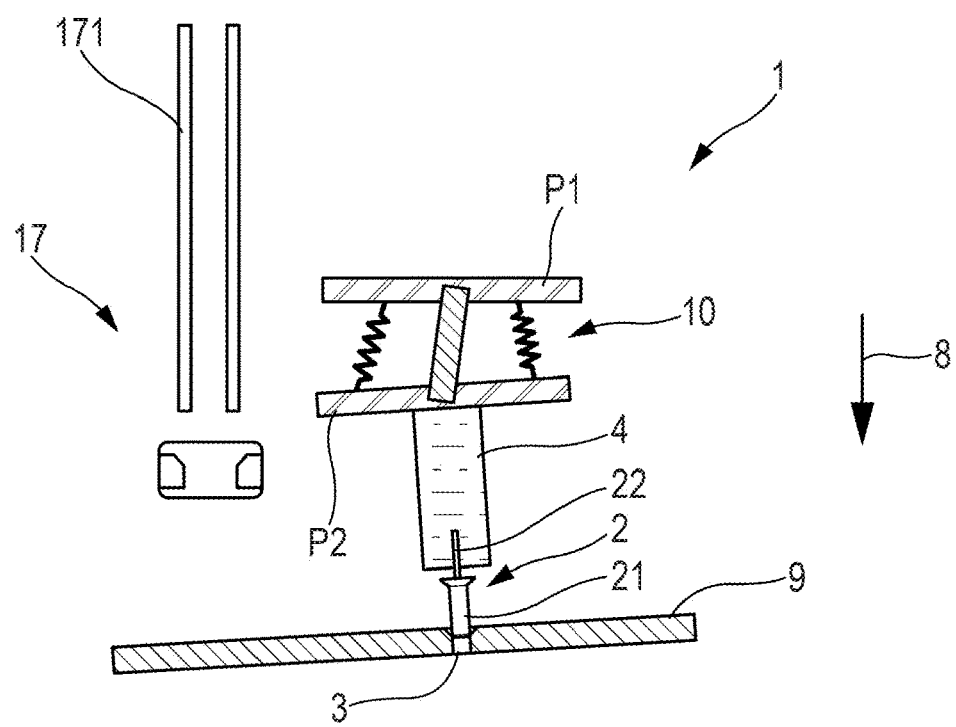
FIG. 9 shows, schematically, a step of the method.

The installation method comprises the following steps:
a step E1 of installing the blind fastener 2 on the insertion device 4. The blind fastener 2 is held by the jaw 125 of the insertion device 4 via the mandrel 22 (FIGS. 5, 6 and 7),
a step E2 of roughly aligning the blind fastener 2 with the fastening site 3, intended to be implemented, for example, by the movement device 5, comprising roughly aligning the blind fastener 2 with the fastening site 3,
a step E3 of moving the blind fastener 2 towards the fastening site 3, intended to be implemented by the movement device 5, comprising moving the insertion device 4 and the pulling and extracting device 12 towards the plane 9 of the fastening site 3 in order for the fastening shank 21 to be installed in the fastening site 3 prior to swaging (FIG. 8);
an alignment step E4 implemented by the passive compliance device 10 that binds the insertion device 4 to the pulling and extracting module 12 (FIGS. 8 and 9). The passive compliance device 10 installs the blind fastener 2 in the fastening site 3 such that the longitudinal axis A2 is substantially aligned with the longitudinal axis A1.

The method can also comprise:
a step E5 of pulling the mandrel 22, implemented by the pulling and extracting device 12, comprising pulling on the jaw 125 in order to pull on the mandrel with a pulling force FT so as to deform the shaft 212 of the fastening shank 21 to swage the fastening shank 21 in the fastening site 3 and
a step E6 of extracting the mandrel 22, implemented by the pulling and extracting device 12, comprising extracting the mandrel 22 after the fastening shank 21 has been swaged in the fastening site 3 and the mandrel 22 has broken (FIGS. 10 and 11), a step E7 of receiving the extracted mandrel 22, in the mandrel container 13 (FIG. 12).

Figure 10:
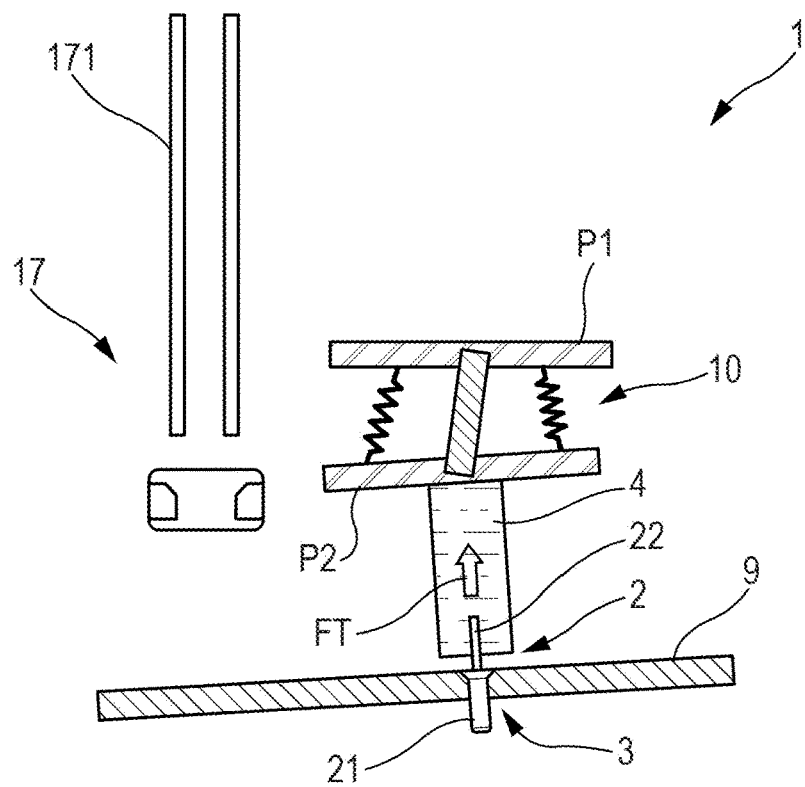
FIG. 10 shows, schematically, a step of the method.

The pulling step can comprise:
a sub-step E51 of pulling, implemented by the pulling member 122, comprising applying a predetermined pulling force FT to the tube 121 at the end 123 (FIG. 9),
a sub-step E52 of swaging the fastening shank 21 by means of the predetermined pulling force FT that pulls on the mandrel 22 in order to deform the shaft 212 of the fastening shank 21 held in the fastening site 3 by the bearing wall 41,
a sub-step E53 of breaking the mandrel 22 after swaging of the fastening shank 21 (FIG. 10).

Moreover, the extraction step E6 can comprise:
a sub-step E61 in which the mandrel 22 stores potential energy provided by the pulling force FT generated by the pulling member 122,
a sub-step E62 of transforming the potential energy into kinetic energy after the mandrel 22 has broken,
a sub-step E63 of dislodging the mandrel 22 from the jaw 125 by means of the kinetic energy,
a sub-step E64 of moving the mandrel 22 through the tube 121 up to the mandrel container 13 (FIG. 11) by means of the kinetic energy.

The method can further comprise a distancing step E7, intended to be implemented by the movement device 5, comprising moving the insertion device 4 away from the fastening site 3 (FIG. 12).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for installing a blind fastener in a fastening site, the fastening site comprising a first longitudinal axis, the blind fastener comprising a fastening shank and a mandrel, the fastening shank having a head and a shaft and being configured to be swaged in the fastening site, the mandrel being configured to deform the shaft of the fastening shank in order to swage the fastening shank in the fastening site, the mandrel being configured to be detached from the fastening shank by breaking after the swaging of the fastening shank, the blind fastener comprising a second longitudinal axis, the system comprising:
an insertion device configured to insert the blind fastener into the fastening site, the insertion device comprising a jaw configured to hold the blind fastener via the mandrel;
a pulling and extracting device configured to pull on the jaw of the insertion device to apply a pulling force to the mandrel to deform the shaft of the fastening shank to swage the fastening shank in the fastening site and extract the mandrel after the fastening shank has been swaged in the fastening site and the mandrel has broken; and a passive compliance device that binds the insertion device to the pulling and extracting device, the passive compliance device being configured to allow a passive alignment of the second longitudinal axis with the first longitudinal axis during an installation of the blind fastener in the fastening site.

2. The system as claimed in claim 1, further comprising a movement device configured to move the insertion device and the pulling and extracting device towards the fastening site for the fastening shank to be installed in the fastening site before swaging and to move the insertion device and the pulling and extracting device away from the fastening site once the fastening shank has been swaged.

3. The system as claimed in claim 1, wherein the passive compliance device corresponds to a remote center compliance device comprising a first plate fastened to the pulling and extracting device, a second plate fastened to the insertion device and compliance members between the first plate and the second plate.

4. The system as claimed in claim 3, wherein the pulling and extracting device further comprises a mandrel container configured to receive the extracted mandrel.

5. The system as claimed in claim 4, wherein the pulling and extracting device comprises a first tube and a pulling member,
the first tube comprising a first end and a second end, the first end of the first tube being fastened to the pulling member, the first end of the first tube emerging in the mandrel container, the second end of the first tube being fastened to the jaw of the insertion device,
the pulling member being configured to apply a predetermined pulling force to the jaw, the pulling force being transmitted to the jaw via the first tube, and
the first tube comprising a flexible section between the first plate and the second plate of the remote center compliance device, the predetermined pulling force being suitable for pulling on the jaw to pull the mandrel to deform the shaft of the fastening shank which is held in the fastening site by a bearing wall of the insertion device to swage the fastening shank in the fastening site until the mandrel breaks after the swaging of the fastening shank, the pulling and extracting device comprising a second flexible tube, the second flexible tube at least partially surrounding the flexible section of the first tube between the first plate and the second plate, the second flexible tube comprising a first end and a second end, the first end of the second flexible tube being fastened to the first plate, the second end of the second flexible tube being fastened to the second plate, the first tube being capable of sliding freely in the second flexible tube without applying any force leading to a change in a configuration of the passive compliance device.

6. The system as claimed in claim 5, wherein the predetermined pulling force is also suitable for providing the mandrel with potential energy, the potential energy provided by the pulling force being capable of being transformed into kinetic energy after the mandrel has broken, the kinetic energy being capable of dislodging the mandrel from the jaw and moving the mandrel through the first tube up to the mandrel container.

7. A method for installing a blind fastener in a fastening site implemented by the installation system as claimed in claim 1, the installation method comprising the following steps:

installing the blind fastener on the insertion device, the blind fastener being held by the jaw of the insertion device via the mandrel,
moving the blind fastener towards the fastening site, comprising moving the insertion device and the pulling and extracting device towards the fastening site for the fastening shank to be installed in the fastening site prior to swaging; and
wherein the method further comprises an alignment step implemented by the passive compliance device that binds the insertion device to the pulling and extracting device, the alignment step provided by the passive compliance device comprising installing the blind fastener in the fastening site such that the second longitudinal axis is aligned with the first longitudinal axis.

8. The method as claimed in claim 7, further comprising:
pulling the mandrel, implemented by the pulling and extracting device, comprising pulling on the jaw to pull on the mandrel to deform the shaft of the fastening shank to swage the fastening shank in the fastening site, and
extracting the mandrel, implemented by the pulling and extracting device, comprising extracting the mandrel after the fastening shank has been swaged in the fastening site and the mandrel has broken, and
receiving the extracted mandrel in a mandrel container.

9. The method as claimed in claim 8, wherein the pulling and extracting device comprises a first tube and a pulling member,
the first tube comprising a first end and a second end, the first end of the first tube being fastened to the pulling member, the first end of the first tube emerging in the mandrel container, the second end of the first tube being fastened to the jaw of the insertion device,
the pulling member being configured to apply a predetermined pulling force to the jaw, the pulling force being transmitted to the jaw via the first tube, and
the first tube comprising a flexible section between a first plate and a second plate of a remote center compliance device, the predetermined pulling force being suitable for pulling on the jaw to pull the mandrel to deform the shaft of the fastening shank which is held in the fastening site by a bearing wall of the insertion device to swage the fastening shank in the fastening site until the mandrel breaks after the swaging of the fastening shank, the pulling and extracting device comprising a second flexible tube, the second flexible tube at least partially surrounding the flexible section of the first tube between the first plate and the second plate, the second flexible tube comprising a first end and a second end, the first end of the second flexible tube being fastened to the first plate, the second end of the second flexible tube being fastened to the second plate, the first tube being capable of sliding freely in the second flexible tube without applying any force leading to a change in a configuration of the passive compliance device and wherein the step of pulling comprises:
a sub-step of pulling, implemented by the pulling member, comprising
applying the predetermined pulling force to the first tube at the first end,
swaging the fastening shank via the predetermined pulling force that pulls on the mandrel to deform the shaft of the fastening shank held in the fastening site by the bearing wall of the insertion device, and
a sub-step of breaking the mandrel after the swaging of the fastening shank.

10. The method as claimed in claim 9, wherein the extracting step comprises:
- a sub-step in which the mandrel stores potential energy provided by the pulling force generated by the pulling member,
- a sub-step of transforming the potential energy into kinetic energy after the mandrel has broken,
- a sub-step of dislodging the mandrel from the jaw by means of the kinetic energy, and
- a sub-step of moving the mandrel through the first tube up to the mandrel container by means of the kinetic energy.

11. The method as claimed in claim 7, further comprising a distancing step comprising moving the insertion device away from the fastening site.

* * * * *